United States Patent [19]

Chaffee et al.

[11] Patent Number: 4,843,969
[45] Date of Patent: Jul. 4, 1989

[54] MULTI-PLENUM AIR FLOAT FOR LOAD TRANSPORTATION AND AMUSEMENT RIDE SYSTEM

[75] Inventors: Brad A. Chaffee, Littleton; George E. Morse, Denver, both of Colo.

[73] Assignee: The Gates Rubber Company, Denver, Colo.

[21] Appl. No.: 142,967

[22] Filed: Jan. 12, 1988

[51] Int. Cl.⁴ ............................................. B60V 1/06
[52] U.S. Cl. ................... 104/23.2; 104/69; 180/121; 180/125; 406/89
[58] Field of Search ............ 104/23.1, 23.2, 69; 406/86, 88, 89; 180/118, 120, 121, 124, 125

[56] References Cited

U.S. PATENT DOCUMENTS

| | | |
|---|---|---|
| 2,938,590 | 5/1960 | Barnett. |
| 3,237,708 | 3/1966 | Strasser et al. |
| 3,268,022 | 8/1966 | Gustafson ............................. 180/7 |
| 3,470,827 | 10/1969 | McLean ............................. 104/134 |
| 3,623,434 | 11/1971 | Jarns ............................. 104/23.2 X |
| 3,648,852 | 3/1972 | Willoweit. |
| 3,780,823 | 12/1973 | Michaud et al. |
| 3,917,022 | 11/1975 | Brooks, Jr. ........................... 180/127 |
| 3,948,344 | 4/1976 | Johnson ............................. 180/124 |
| 4,155,421 | 5/1979 | Johnson et al. ..................... 180/125 |
| 4,298,083 | 11/1981 | Johnson et al. ..................... 180/125 |
| 4,399,885 | 8/1983 | Johnson et al. ..................... 180/125 |
| 4,417,638 | 11/1983 | Harvey ............................. 180/125 |
| 4,567,957 | 2/1986 | Johnson ............................. 180/124 |
| 4,643,268 | 2/1987 | Jones et al. ........................ 180/116 |

FOREIGN PATENT DOCUMENTS

| | | |
|---|---|---|
| 712020 | 6/1965 | Canada. |
| 782892 | 4/1968 | Canada ............................. 180/125 |

Primary Examiner—Andres Kashnikow
Attorney, Agent, or Firm—C. H. Castleman, Jr.; H. W. Oberg, Jr.; J. E. Ebel

[57] ABSTRACT

An externally propelled load transporting apparatus that transports a uniformly distributed, non-uniformly distributed, or shifting load upon a cushion of air by first directing pressurized air into at least two plenum chambers and then through at least one flexible perforated sheet, wherein each plenum is substantially, independently pressurized.

31 Claims, 8 Drawing Sheets

MULTI-PLENUM AIR FLOAT FOR LOAD TRANSPORTATION AND AMUSEMENT RIDE SYSTEM

FIELD OF THE INVENTION

In general, this invention relates to air flotation apparatus for moving or transporting a load such as merchandise for display or a passenger, over a surface, and it relates to an air float apparatus amusement ride system. More particularly, this invention relates to an apparatus capable of producing a friction-reducing cushion of air upon which a load can be floated and moved from one point to another by means external to the apparatus.

DESCRIPTION OF THE PRIOR ART

In order to transport a load seated upon or in a load-support member such as a pallet, display shelf, file cabinet, passenger carrier without wheels or rollers, box or crate, the frictional forces between the support member and the surface upon which it is sitting, and also over which it will be moved, must be overcome. Wheels, rollers and air bearings or air cushions are all known mechanisms which can reduce the friction between a load-support member and a surface over which the load-support member will be moved. In particular, two known devices employing an air bearing or cushion of air are: the planar air pallet as disclosed in U.S. Pat. No. 3,948,344 having either a rigid pallet or flexible sheet sandwiched between two flexible perforated outer layers, and having a single external pressurized air source to inflate the spaces between the center pallet or sheet and the outer layers; and the air lifted and propelled vehicle as disclosed in U.S. Pat. No. 4,643,268 issued to Jones et al. having a non-planar upper deck and a perforated sheet attached directly below so as to define a plenum which remains open even when the air within the plenum is not pressurized, and having a single self-contained means for pressurizing the plenum and propelling the vehicle.

Known load-transport devices employing air bearings or cushions of air attempt to move loads over a ground surface by supplying pressurized air to a single plenum, or two plenums stacked one above the other or sitting side by side as found in Jones et al., from a single source.

The use of a single source of pressurized air to supply air through one or two plenums, thus producing a cushion of air immediately outside of each plenum, makes it difficult to transport loads of various shapes and sizes that are distributed non-uniformly over the surface above the plenum or two plenums, and/or makes it difficult to transport a load with a center of gravity that shifts from place to place above the plenum or two plenums. The difficulty arises in trying to lift, support and stabilize upon a cushion of air, such non-uniformly distributed and/or shifting loads. These known devices are limited to transporting a specific size and type of load; therefore, they have very limited uses.

It is a primary object of this invention to provide an improved, substantially portable, air float load-transport apparatus that can transport with greater stability, upon a cushion of air, relatively large loads which are non-uniformly distributed over the apparatus or which have a center of gravity that is not centered in the middle of the apparatus. It is another object to produce such a substantially portable, air float load-transport apparatus by proper design of at least two plenum chambers which are substantially independently pressurized and are so positioned on the device to sufficiently support, upon a cushion of air, a load with a center of gravity that shifts from one area of the apparatus to another.

It is yet another object of this invention to produce such a substantially portable, air float load-transport apparatus by proper design of a means for supplying pressurized air to the plenum chambers, to ensure that each plenum is effectively independently pressurized so that non-uniformly distributed and shifting loads are adequately supported upon a cushion of air. It is another object to produce a substantially portable, air float load-transport apparatus by proper simplified design to minimize the cost of production.

It is yet another object of this invention to provide a substantially portable, air float merchandise-transport apparatus that can easily move displayed merchandise from one location to another. It is another object of this invention, in an alternative form, to provide for an amusement ride system that floats passengers upon a cushion of air along a generally predetermined desired path surface. It is yet another object of this invention to produce such an amusement ride system by proper design of a means for guiding a substantially portable air float passenger-transport apparatus over a generally predetermined desired path surface, that can move passengers from a starting location to a finishing location over a relatively short desired path surface without needing to greatly elevate the starting location with respect to the finishing location.

SUMMARY OF THE INVENTION

In one form, the present invention is directed to an improved, substantially portable apparatus, propelled by external means, for easy transport or movement of a load upon a friction-reducing cushion of air, such load being either uniformly or non-uniformly distributed over the apparatus, or such load to have a center of gravity that shifts from one area of the apparatus to another. The apparatus is comprised of: a load support member; a plurality of plenum backing members, each of which has at least one air inlet aperture and has upper and lower surfaces; a plurality of thin flexible perforated sheets, each of said plenum backing members having at least one perforated sheet fixedly attached thereto, so as to define a plenum chamber associated with each perforated sheet; means for coupling the upper surface of each of said plenum backing members having at least one perforated sheet fixedly attached thereto, to the load-support member; and means for supplying pressurized air to the plenum chambers through each air inlet aperture, comprising a plurality of substantially independent sources of pressurized air, so that sufficient air resides in each plenum chamber at a pressure greater than that outside each plenum chamber to force air through the perforations in each perforated sheet, thus creating an air cushion between each perforated sheet and the surface over which the portable apparatus will move.

There is also described an embodiment in which the substantially portable apparatus described above is used to transport merchandise, wherein the substantially independent sources of pressurized air are substantially self-standing units and the load comprises merchandise intended to be displayed. This embodiment is further and more particularly described as having at least one partially flexible plenum backing member that is configured to be capable of generally contouring the surface over which the substantially portable apparatus will move so that the plenum backing member remains generally parallel to the surface.

In another embodiment, the substantially portable apparatus described above is used to transport passengers, wherein the substantially independent sources of pressurized air are substantially self-standing units; the load to be moved upon a friction-reducing cushion of air is at least one passenger; and the load-support member is a passenger carrier means so configured as to adequately carry at least one passenger over the surface over which the apparatus will move.

The invention may also comprise an amusement ride system within which the substantially portable passenger-transport apparatus described above is incorporated. In particular, the substantially independent sources of pressurized air of the passenger-transport apparatus each comprise a fan means and there is at least one motor means to drive the fan means, and to complete the system the passenger transport apparatus is associated with a means for guiding the portable apparatus and a means for powering the motor means.

In another embodiment, the substantially portable apparatus described above is used to transport motor vehicles having tires, wherein the substantially independent sources of pressurized air are substantially self-standing units; the load support member comprises the load bearing members of a motor vehicle; and the means for coupling the upper surface of each of said plenum backing members is provided by configuring each upper surface with an indentation.

BRIEF DESCRIPTION OF THE DRAWINGS

The invention in its preferred embodiments will be described in conjunction with the attached drawings, in which like numerals designate like parts, and in which.

DESCRIPTION OF THE PREFERRED EMBODIMENTS

A multi-plenum air float apparatus for transporting a load, seated upon or in a load-support member, over a friction-reducing cushion of air will be particularly described. Although particular load-transport applications will be described, it will be appreciated that the load-support member of the invention can have various shapes and the load to be transported can take various forms; and it will be appreciated that the friction-reducing cushion can be produced by using various fluids.

Figure 1:
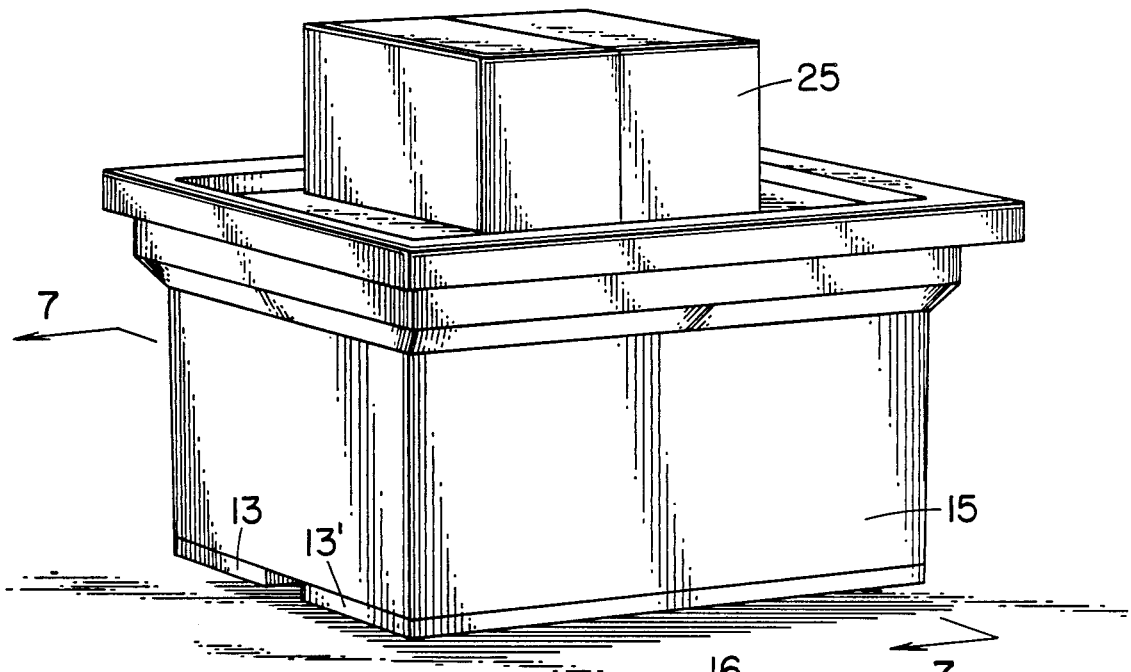
FIG. 1 is a perspective view of one preferred multi-plenum air float apparatus that has a load-support member carrying a load.

Referring to FIG. 1, this preferred apparatus shows a load 25, such as merchandise intended to be displayed, seated upon a load-support member 15 specifically configured to display the load in a predetermined desired fashion. Two plenum chambers are positioned below the load-support member 15. Each plenum chamber is defined by a flexible perforated sheet 13 or 13' as shown wrapped around a plenum backing member which is hidden. Shown at 16 is the generally planar surface over which this apparatus will move. Since this invention has at least two effectively independently pressurized plenum chambers, the apparatus can move smoothly over a surface 16 that has irregularities such as a 2" high door sill or a 2" wide gap. If any portion of a pressurized cushion of air located directly beneath a plenum chamber disappears for any reason, the other independently pressurized plenum chamber(s) can keep the apparatus "floating" upon its own cushion of air.

Figure 7:
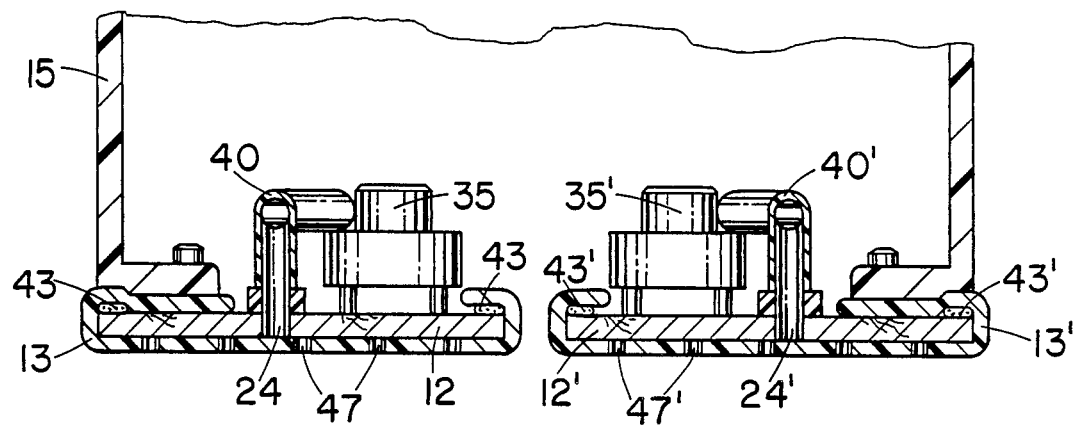
FIG. 7 is a partial, sectional view taken along line 7—7 of FIG. 1 illustrating two motorized fans mounted within the confines of a merchandise transporting load-support member.

Referring to FIG. 7, this drawing illustrates: two motorized fans 35, 35' each acting as a substantially self-standing unit for supplying pressurized air to each of its associated plenum chambers, shown at 38 in FIG.

8; two conduits 40, 40' which allow pressurized air to flow from the motorized fans into the plenum chambers via the air inlet apertures 24, 24'; two flexible perforated sheets 13, 13' with perforations at 47, 47' each sheet being wrapped around one plenum backing member 12, 12' and sealed thereto by way of an adhesive 43, 43'; and a merchandise display load-support member 15 attached to each plenum backing member 12, 12'. The motorized fans need not be positioned as shown and can be powered by an external or internal battery source for portability, or other power supply source. Each plenum backing member 12, 12' made of wood, molded plastic or polymer, a metal or metal alloy, or some suitable composite has at least one air inlet aperture 24, 24' through its entire thickness.

Figure 12:
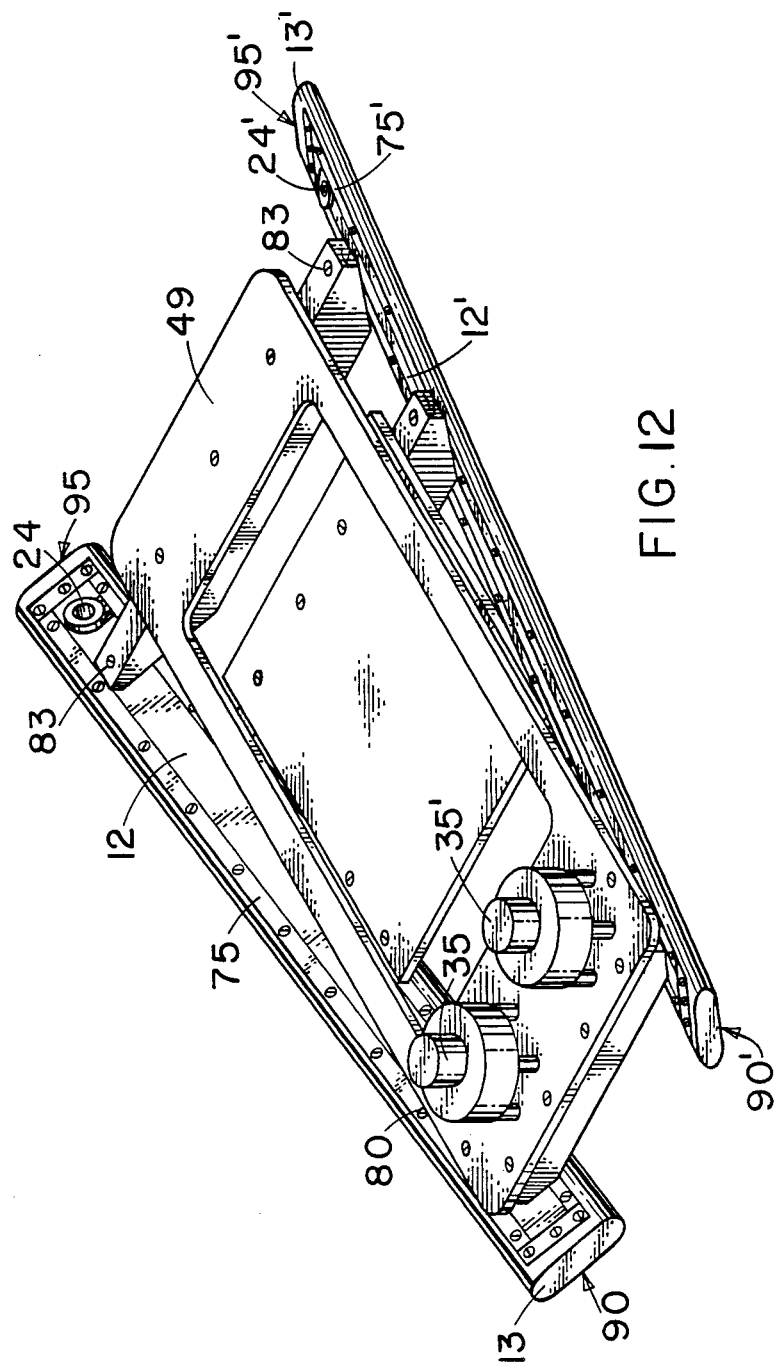
FIG. 12 is a perspective view of the alternative preferred embodiment shown in FIG. 5 absent the upper portion of the passenger carrier means and absent any conduits connected between the plenum backing member air inlet apertures and the two shown motorized fans. These elements have been left out to illustrate the configuration and attachment position of two plenum backing members, each having one flexible perforated sheet fixedly attached thereto.

Lining the lower side of each plenum backing member 12, 12' is one flexible perforated sheet 13, 13' made of any perforated, generally abrasion resistant, flexible thin film such as vinyl impregnated cheesecloth or vinyl with nylon reinforcement. The sheets 12, 13' are attached to plenum backing members 12, 12' near the sheets' periphery; preferably each sheet 13, 13' is cut slightly larger than the size of one plenum backing member 12, 12' allowing a sheet to be folded over the outside edge of the plenum backing member and adhered thereto, using a desired method of attachment such as an adhesive 43, 43' alone, or an adhesive combined with bolts, screws or some other suitable fastener as shown in FIG. 12 at 75 and 80.

It has been observed that known single plenum air cushion devices having only one pressurized air source have much difficulty transporting very tall stacked loads or non-uniformly distributed loads such as merchandise intended to be displayed, as well as loads with centers of gravity that shift from one area to another such as a passenger or passengers being transported through turns of an amusement ride. Referring specifically to FIGS. 1-5 inclusive and FIG. 14, each apparatus shown has two plenum chambers which are effectively independently pressurized; however, depending upon how each load shown at 25, or the passenger shown at 27, is arranged and depending also upon the characteristics of the surface over which each apparatus will move, more than two plenum chambers can be used and positioned under the various load-support members shown at 15, 17, 19, 39, 49 and 98, to ensure proper lift.

A single, sufficiently pressurized, external line-source of pressurized air can be used in place of separate motorized fans to pressurize each plenum chamber, as long as each plenum chamber is effectively independently pressurized, i.e. each plenum chamber acts as an independent "cushion system" that is able to maintain a particular pressure regardless of the forces exerted on other plenum chambers.

Figure 8:
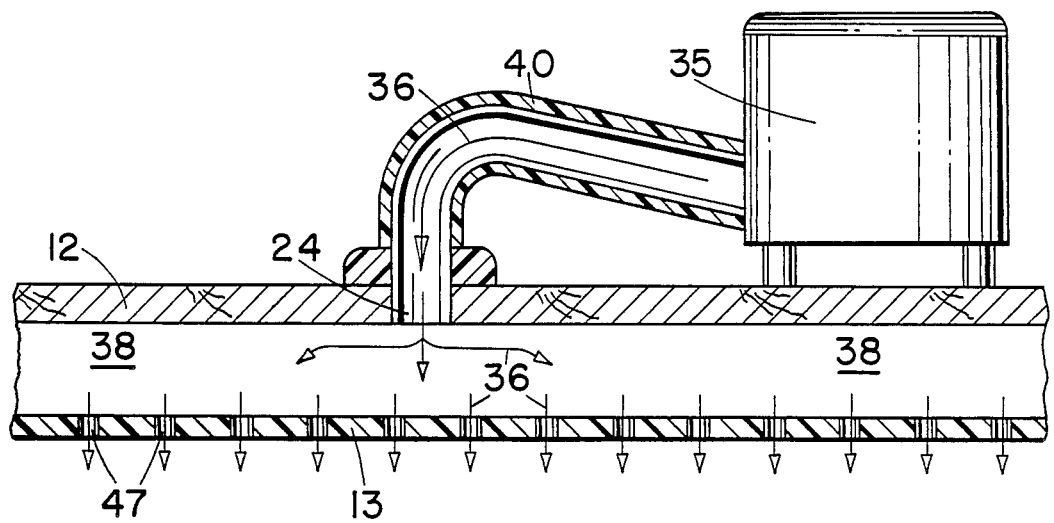
FIG. 8 is an enlarged, partial cutaway, sectional view similar to that of FIG. 7 showing the direction of air flow from one of the motorized fans through the plenum backing member, thus creating a plenum chamber, and then out of the plenum chamber forming a cushion of air.

FIG. 8 partially illustrates a preferred apparatus in operation by showing the direction 36 of air flow from one motorized fan 35, through one conduit 40 and then through an air inlet aperture 24, thereby forming a plenum chamber 38, and then flowing out of the plenum chamber 38 through the sheet perforations 47 forming the cushion of air upon which the apparatus will "float".

As can be seen in FIG. 7, perforated sheets 13, 13' will directly contact the entire area of the lower surface of plenum backing members 12, 12' when no pressurized air is supplied to the plenum chambers and the plenum chambers are free of a separate means for actively dispersing the air therein. Although it is not necessary for initially lifting the apparatus and load, a separate means for actively dispersing the air within any one of the plenum chambers such as an air permeable or porous textile pad, ribbing, or some type of physical separation, can be added.

Figure 9:
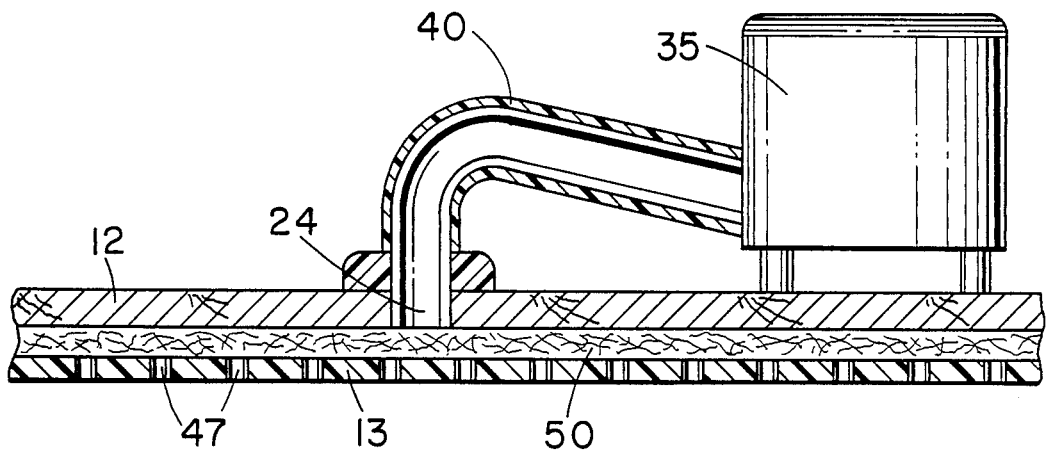
FIG. 9 is an enlarged, partial cutaway, sectional view of an alternative to the embodiment of FIG. 8 illustrating one of the motorized fans, one conduit, and the relative placement of an air permeable or porous textile pad between a plenum backing member and a thin flexible perforated sheet.

FIG. 9 shows the relative placement of such an air dispersion means 50 in the form of a porous textile pad, below one of the plenum backing members 12. An air dispersion means 50 is desirable in situations where the load to be transported is extremely heavy, or where the plenum backing members 12 are required to be made of a high modulus material that is rigid. Typically, if the plenum backing members 12 are of a material and/or size and/or configuration as to render them partially flexible, no physical separation for actively dispersing the air between the sheet 12 and a plenum backing member 12 need be present. The following factors, among others, affect the need for a separate means for actively dispersing the air within each plenum chamber: size and/or weight of the load 25 to be transported; rigidity or flexibility of the plenum backing members 12; size and/or configuration of the plenum backing members 12; size, location, and number per plenum backing member, of the air inlet apertures 24; number and volume of the plenum chambers 38 as pressurized (see FIG. 8); and pressure of the air being supplied to the plenum chambers 38 via the air inlet apertures 24.

Note also that the relative placement of the air dispersion means 50, as shown in FIG. 9, is the same as it would be for a flexible perforated sheet corner protection pad which can be made from a textile pad material such as a nonwoven felt that has been needle punched and/or thermoformed in accordance with the method described in U.S. Pat. No. 4,424,250, polyurethane foam, or other similar cushioning material. A corner protection pad placed, as shown, between a plenum backing member 12 and a sheet 13 increases the life expectancy of the sheet 13 since abrasion resulting from contact of the corners of a backing member 12 and sheet 13, is minimized.

Figure 2:
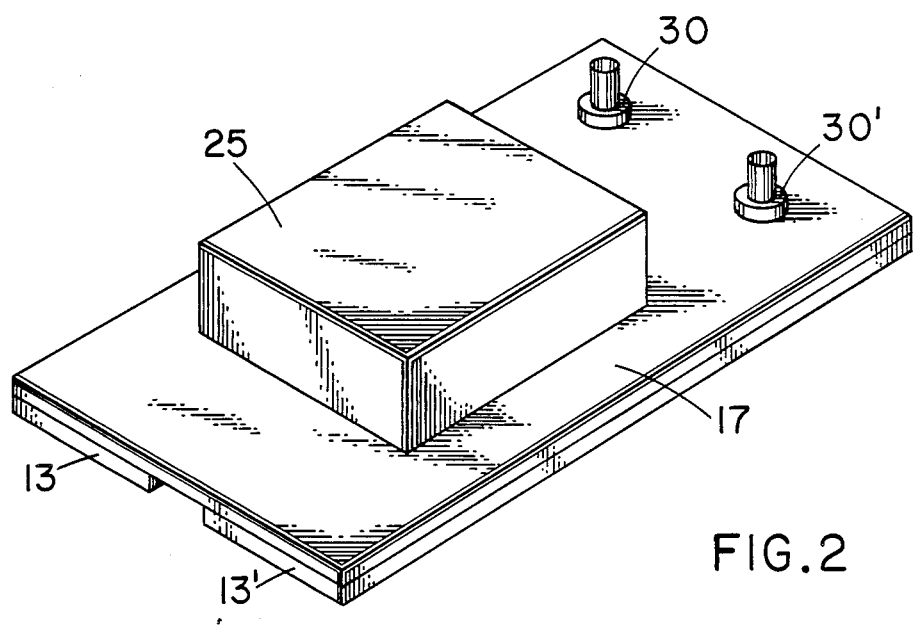
FIG. 2, FIG. 3 and FIG. 5 are perspective views of alternative preferred multi-plenum air float apparatuses, each of which have a load-support member carrying a load.

Turning to FIG. 2, a load 25 is carried on a load-support member 17 under which, preferably, two plenum backing members, each having one flexible perforated sheet 13, 13' fixedly attached thereto, are positioned. Since the sheets 13, 13' are shown as wrapped around the backing members, the backing members cannot be directly seen. Two nozzles 30, 30' are shown having the capacity to accept air from external, substantially independent sources of pressurized air and then channel such air through the load-support member 17 and backing members, into each plenum chamber below. This particular simplified apparatus could be manufactured at a very low cost. Such an apparatus would preferably have, for example, at least two plenum backing members made of plywood or cardboard and perforated sheets made of a flexible thin material such a DuPont's "Tyvek", which are attached to the plenum backing members by way of an adhesive such as double-sided tape or glue.

Figure 3:
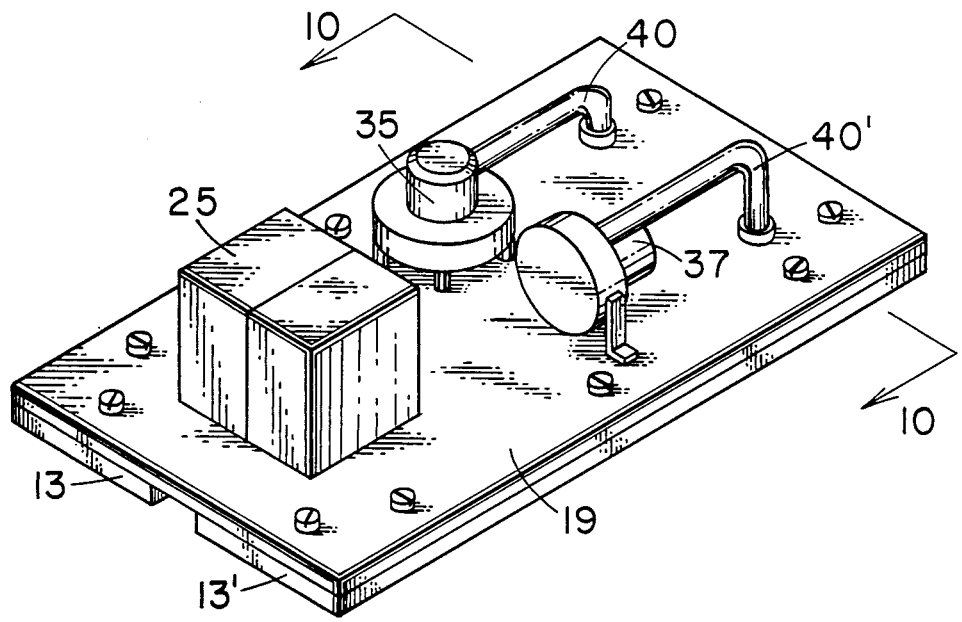

FIG. 3 shows a load 25 seated upon a generally planar load-support member 19. Directly beneath the load-support member 19 are two plenum chambers, each being defined in part by sheets 13, 13' which are shown wrapped around two hidden plenum backing members. Motorized fan 37 supplies pressurized air to one plenum chamber via conduit 40' and motorized fan 35 supplies pressurized air to the other plenum chamber via conduit 40.

Figure 10:
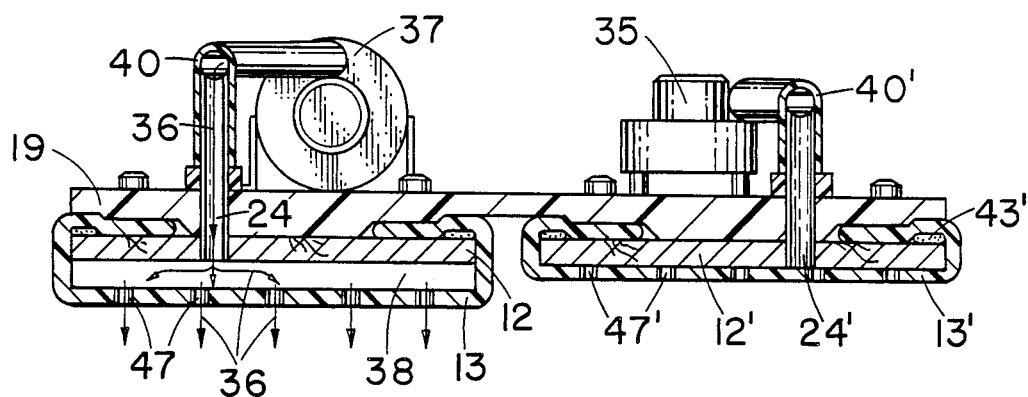
FIG. 10 is a sectional view taken along line 10—10 of FIG. 3 illustrating two motorized fans, one of which is shown supplying air sufficient to create a plenum chamber and a cushion of air, and both of which are mounted upon a load-support member that is no longer supporting the load shown in FIG. 3.

FIG. 10 shows the apparatus of FIG. 3 in operation; its operation is, in principle, like that of the apparatus shown in FIGS. 1, 7 and 8. Again, air flows in the direction indicated by arrows 36. Note that the FIG. 10 apparatus is shown with only one plenum chamber 38 formed. This has been done to indicate that each source of pressurized air, such as the motorized fans shown at 35 and 37, can independently supply pressurized air to a single plenum chamber. In normal operation, at least two plenum chambers 38 will be inflated to a pressure that is sufficiently greater than that outside the chamber, so that air will be forced out through the sheet perforations 47.

Figure 4:
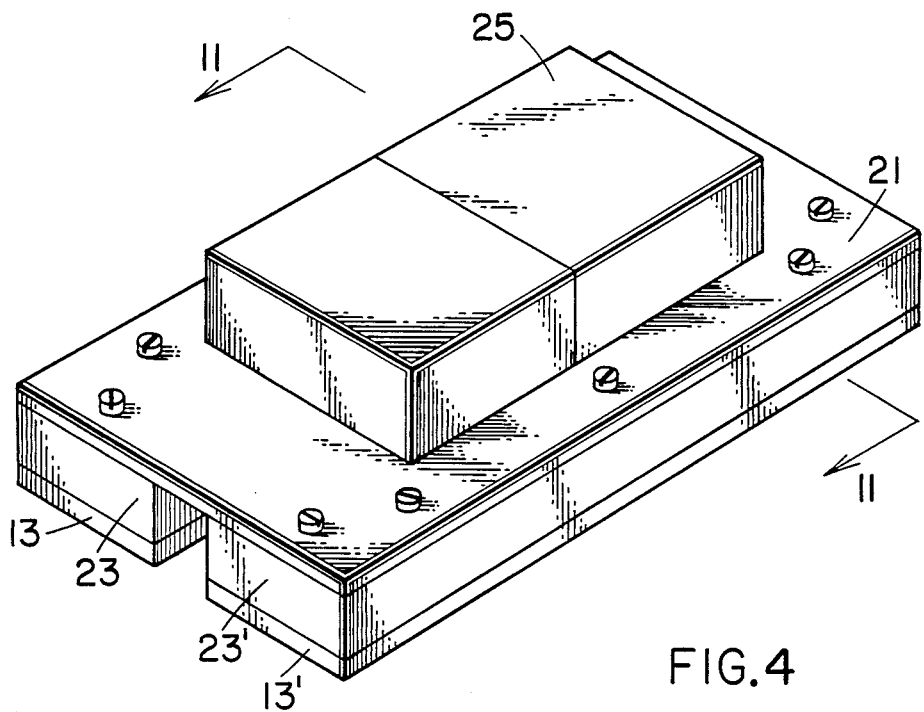
FIG. 4 is a perspective view of an alternative air float apparatus, which has a load-support member carrying a load.

FIG. 4 shows a load 25 seated upon a generally planar load-support member 21. Attached to the load-support member 21, and directly below, are two outer housings 23, 23' each of which contains its own substantially independent source of pressurized air, not shown. Beneath each housing 23, 23' is a plenum chamber which is defined in part by either of sheets 13, 13' by wrapping one sheet around one hidden plenum backing member.

Figure 11:
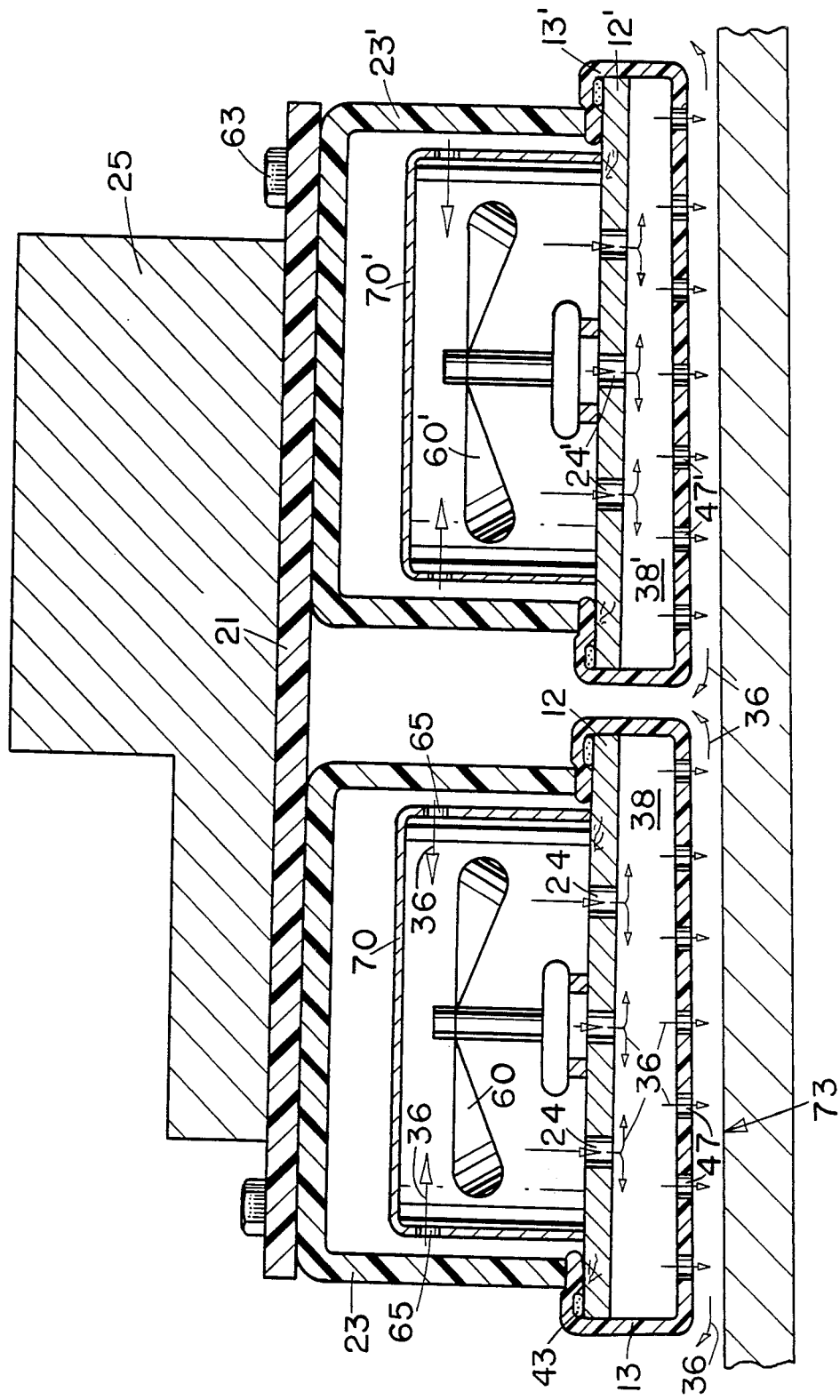
FIG. 11 is a sectional view taken along line 11—11 of FIG. 4 illustrating an alternative method of supplying pressurized air sufficient to create plenum chambers, wherein both motorized fans are shown as supplying air directly to each plenum chamber and a load is shown as being non-uniformly distributed over the load-support member.

The apparatus shown in FIG. 11 illustrates two independent sources of pressurized air 60, 60' in operation. Each plenum chamber 38, 38' is capable of being inflated by an independent source of pressurized air such as a motorized fan means 60, 60' supplied with power by a source (not shown) located either within the confines of each outer housing 23, 23' or external to the housings 23, 23'. Focusing, now, on one inflated plenum chamber, air traveling in direction 36 is first drawn into the confines of the air supply housing 70 through one or more holes 65. It is then forced out through multiple air inlet apertures 24 thereby forming a plenum chamber 38, and finally exits the plenum chamber through the sheet perforations 47 to form a cushion of air. The distance between the lower surfaces of sheets 13, 13' and the surface 73 over which the apparatus will move, has been exaggerated for purposes of illustration. An outer housing 23, 23' made out of a polymer, for example, can be fixedly attached to each of the plenum backing members 12, 12' by means of bolts, screws or some other method (the attachment method is not shown) in order to further seal the perforated sheets 13, 13' to the plenum backing members 12, 12'; and each outer housing 23, 23' can be fixedly attached to the load-support member 21 by means of bolts, screws or some other method, an example of which is shown at 63. Thus, each outer housing 23, 23' preferably acts as a means for coupling or attaching each plenum backing member 12, 12' to the load-support member 21.

Shown, also, in FIG. 11 is the effect of a load 25 that is non-uniformly distributed over load-support member 21. Due to the fact that each plenum chamber 38, 38' is effectively independently pressurized and due to the fact that there are multiple smaller plenum chambers 38, 38' below the load-support member 21 rather than only one large chamber, the "wedging effect" produced by increasing the load on only one side of the load-support member, and shown in plenum chamber 38', is minimized. Minimizing the "wedging effect" allows the apparatus to maintain a cushion of air between the lower surface of each sheet 13, 13' and the surface over which the apparatus will move 73. Minimizing the "wedging effect" is necessary since, once the "wedging effect" becomes pronounced, it is likely that backing member 12' will come into contact with sheet 13' and sheet 13' will contact the surface 73, thus causing the apparatus to drag and sheet 13' to wear.

Figure 5:
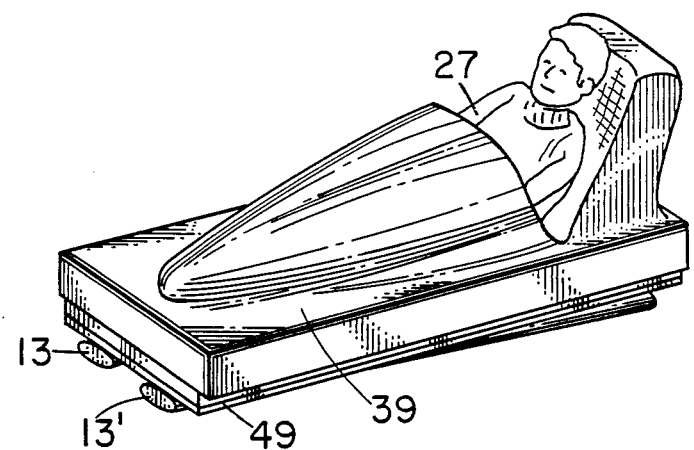

Turning to FIG. 5, illustrated is a load 27, consisting of a passenger, seated upon and within a load-support member or passenger carrier means having an upper portion 39 and a bottom portion 49. Attached to the passenger carrier means 39, 49 are two hidden plenum backing members, each of which has one sheet 13, 13' wrapped around and fixedly attached thereto.

Referring to FIG. 12, this perspective view of the apparatus in FIG. 5 is absent the upper portion of the passenger carrier means 39 and absent any connecting conduits so that it can illustrate the configuration and position of two plenum backing members 12, 12' each of which have a flexible perforated sheet 13, 13' fixedly attached thereto. The method of attachment shown comprises a seal, that cannot be seen but is similar to that shown in FIG. 7 at 43, a strip of high modulus material 75, and fastening means such as bolts or screws 80. This attachment method is not limited to the method shown, but includes various other types of attachment means. Each backing member 12, 12' is attached to the bottom portion 49 by means of bolts or screws 83, however, this attachment means is not limited to that shown.

Figure 6:
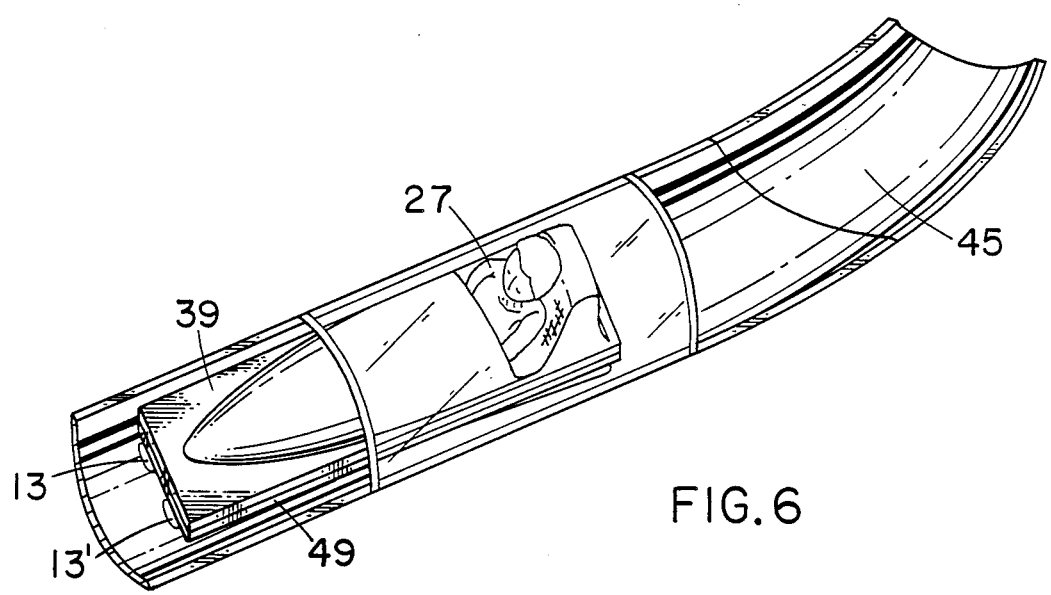
FIG. 6 is a perspective view of an amusement ride system that has incorporated within it, the alternative preferred embodiment shown in FIG. 5.

As shown in FIG. 6 and FIG. 12 the plenum backing members are configured so that they are capable of generally contouring the surface over which the apparatus will move. This allows each backing member to remain generally parallel to the surface of track 45, which aids in forming a cushion beneath the entire portion of each sheet 13, 13'. It is important to contour the backing members 12, 12' in light of the following. If any portion of the perforated sheet beneath a pressurized plenum chamber is lifted too far above the surface over which the apparatus will move, the air through the perforations of the lifted portion of the sheet escapes into the atmosphere rather than forming a cushion beneath the sheet. Thus, the effective area of perforations available to form a cushion decreases, which in turn decreases the maximum load that can be supported upon the cushion of air actually formed. If, during a period of time that the perforation effective area decreases, a uniformly or non-uniformly distributed load is left unchanged (i.e. nothing is done to compensate for a loss in the perforation effective area), a portion of the plenum chamber will "bottom out" causing sheets 13, 13' to contact both the backing members 12, 12' and the surface over which the apparatus will move. The perforated sheet will begin to wear at this point of contact.

As shown in FIGS. 5, 6, and 12, the backing members 12, 12' are positioned so that the distance between the forward endpoints 90, 90' of the longitudinal axis of each backing member is smaller than the distance between the trailing endpoints 95, 95' of the longitudinal axis. This aids the apparatus in riding smoothly along track 45.

In operation, the apparatus in FIG. 12 produces a cushion of air beneath each plenum chamber in a manner similar to the apparatus in FIGS. 1, 7 and 8. Air from each independent source of pressurized air 35, 35' is first directed by a means such as a conduit or hose (not shown) through the air inlet apertures at 24, forming two plenum chambers, and then the air is forced out through each sheet's perforations to form a cushion of air beneath the lower surface of each sheet.

The surface over which the apparatus in FIG. 12 will move can be seen in FIG. 6 as taking the shape of a tube. FIG. 6 shows preferably a track 45 as a means for guiding the upper and bottom portions 39, 49 of the load-support member along a predetermined desired path. The shape of the track 45 could be other than that shown in FIG. 6, such as "V"-shaped or hexagonal. However, a change in the shape of the track 45 would require a change in the configuration of the plenum backing members 12, 12' so that they take the shape of the track's top surface to minimize air escape from the cushion of air below each plenum chamber.

Figure 13:
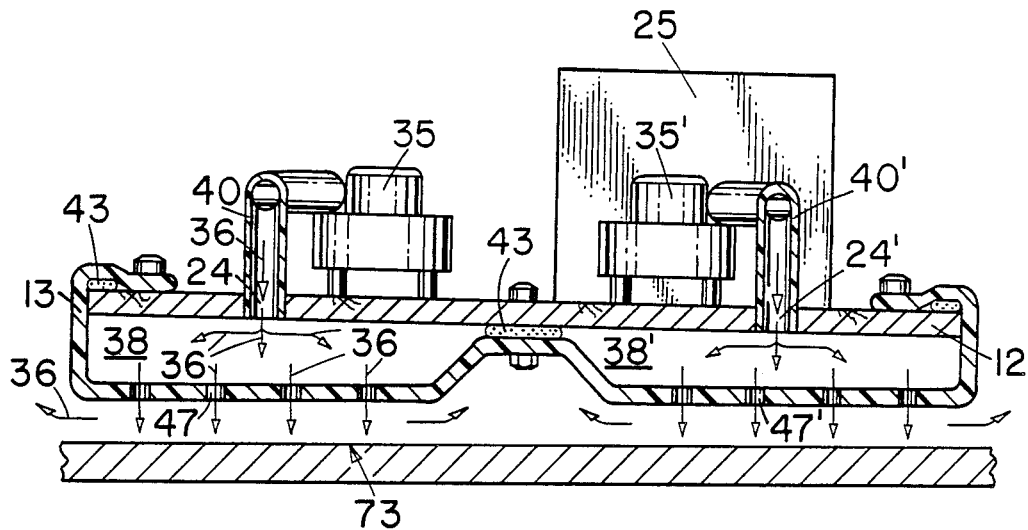
FIG. 13 is a sectional view similar to FIG. 11 illustrating an alternative air float apparatus; this figure shows one plenum backing member supporting a non-uniformly distributed load and two motorized fans supplying air to two plenum chambers.

The apparatus shown in FIG. 13 illustrates two sources of pressurized air 35, 35' in operation. Each plenum chamber 38, 38' is capable of being inflated by a motorized fan 35, 35' supplied with power by a source (not shown) located upon, or external to, backing member 12. Focusing on one inflated chamber 38, pressurized air flows through conduit 40 and air inlet aperture 24, along the direction shown at 36, forming plenum chamber 38. Air is then forced through the perforations 47 in sheet 13 to form a cushion of air. Plenum chambers 38, 38' are defined by sealing perforated sheet 13 to backing member 12 with an adhesive 43 and further securing the sheet 13 by way of a fastening means such as bolts or screws.

FIG. 13 shows the effect of a load 25 that is non-uniformly distributed over, and supported by, plenum backing member 12. The "wedging effect" (shown here and in FIG. 11) produced by increasing the load on only one side of the backing member 12, and readily seen in chamber 38', is minimized because each plenum chamber 38, 38' is effectively independently pressurized and because there exists multiple smaller chambers 38, 38' rather than only one large chamber. By minimizing the "wedging effect", the apparatus shown is able to maintain a cushion of air beneath each plenum chamber 38, 38' and above the surface over which the apparatus will move 73.

Figure 14:
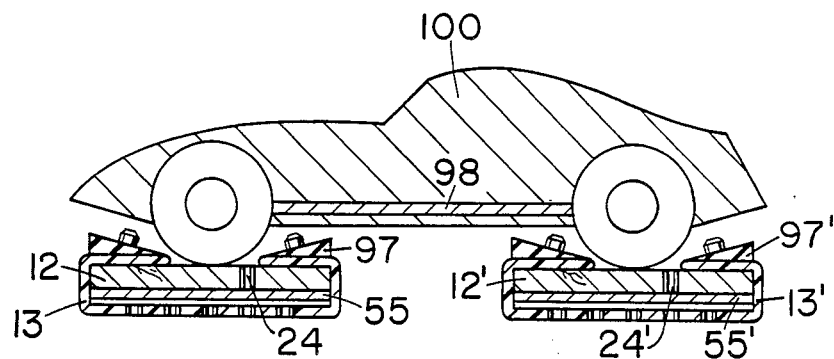
FIG. 14 is a sectional view of an alternative air float apparatus illustrating a motor vehicle coupled to two plenum backing members by way of a backing member indentation configuration; absent from this figure are the conduits and substantially independent sources of pressurized air which supply the plenum chambers (not shown) with pressurized air.

Referring to FIG. 14, load 100 is a motor vehicle having load bearing members 98 and tires. Such load bearing members 98 are fixedly attached to the wheels of the motor vehicle; and the wheels are equipped with tires. Plenum backing members 12, 12' have perforated sheets 13, 13' that are first cut oversize, then wrapped around the periphery of each respective backing member 12, 12', and finally sealingly attached thereto. Air inlet apertures 24, 24' allow air to enter into each plenum chamber from one of two separate substantially independent sources of pressurized air (not shown). Each source of pressurized air communicates with one plenum chamber via a conduit (not shown) so that each chamber is effectively independently pressurized. The load is coupled to each backing member 12, 12' by way of wedge pieces 97, 97' which create an "indentation" of sufficient size to allow the tires to fit into the indentation. The wedge pieces 97, 97' are secured to the backing members 12, 12' by a fastening means such as bolts or screws. Since the periphery of sheets 13, 13' are sandwiched between the wedge pieces 97, 97' and the backing members 12, 12', securing the wedge pieces to the backing members further seals the sheets 13, 13' to the backing members.

Shown also in FIG. 14 at 55, 55' is the relative placement of a sheet corner protection pad. As aforementioned, such a pad is placed beneath a backing member 12, 12' to minimize abrasion resulting from contact of the corners of a backing member with a sheet. Before moving the motor vehicle upon the cushion of air created under each sheet 13, 13', one must be certain that the motor vehicle's tires are incapable of rolling.

The invention will be further explained in reference to the following working examples of the multi-plenum air float apparatus shown in FIG. 1 and FIG. 5.

The FIG. 1 apparatus was prepared generally according to the following specifications: A merchandise display approximately 30" high made of fiberglass, wood, or polyethylene has two ½" plywood generally planar plenum backing members, each approximately 10"×30", attached thereto with bolts and screws; the backing members are spaced approximately ¼" apart and each backing member has one 1¾" diameter air inlet aperture drilled through to allow air to enter into each plenum chamber; two sheets made of perforated heavy gauge "Herculite" (a trademark of Herculite Products, Inc.) cut slightly larger than the 10"×30" backing members, are each wrapped around the periphery of one backing member and fixedly attached thereto by way of adhesive and bolts; each sheet has 13 small perforations per square inch covering 7"×27" to allow air to flow out of the plenum chambers when pressurized; two 2 or 3 stage, 5.7"24 V bypass motorized fans from Ametek are both powered by either a 24 V or 30 V battery system comprising either X cell (5.0AH) E cell (8.0 AH) or J cell (12.5 AH) sealed lead-acid batteries manufactured by Gates Energy Products, Inc. (battery system depends upon frequency of apparatus use and specific lift requirements); and a pressure of 1.2 psi can be attained in each plenum chamber which is sufficient to lift a total of 750 pounds.

The FIG. 5 apparatus (see also details shown in FIG. 12) was prepared generally according to the following specifications: a passenger carrier means or load-support member having an upper portion of fiberglass or molded polyethylene and a 4'×18" bottom portion of either wood or 1" diameter aluminum tubing, or a combination of both, has two ½" thick plywood backing members, each approximately 8"×40", attached thereto with bolts and screws; the backing members where formed to permanently retain a "twisted" configuration so as to take the shape of the upper surface of the tube-shaped track over which the apparatus will "float"; the backing members are positioned beneath the bottom portion of the passenger carrier means so that at the forward end they are spaced approximately 10" center to center and at the trailing end they are spaced approximately 25" center to center; each backing member has one 1¾" diameter air inlet aperture drilled through; two sheets made of perforated heavy gauge "Herculite" (a trademark of Herculite Products, Inc.) cut slightly larger than the 8"×40" backing members, are each wrapped around the periphery of one backing member and fixedly attached thereto using a ½" wide strip of ⅛" thick aluminum and bolts and screws as shown in FIG. 12; each sheet has 13 small perforations per square inch covering 5"×37" to allow air to flow out of the plenum chambers when pressurized; two 2 stage, 5.7"24 V bypass motorized fans from Ametek are both powered by either a 24 V or 30 V battery system comprising the aforementioned J cell (12.5 AH) batteries arranged for convenience within the confines of the upper portion of the passenger carrier means; and a pressure of 1.2 psi can be attained in each plenum chamber wich is sufficient to lift 500 pounds through a track.

While certain representative embodiments and details have been shown for the purpose of illustrating the invention, it will be apparent to those skilled in the art that various changes and modifications may be made therein without departing from the spirit or scope of the invention.

What is claimed is:

1. A substantially portable apparatus, propelled by means external to the portable apparatus, for movement of a load upon a friction-reducing cushion of air, comprising:

a load-support member;

a plurality of partially flexible plenum backing members, each of which has at least one air inlet aperture and has upper and lower surfaces;

a plurality of thin flexible perforated sheets, each of said plenum backing members having at least one perforated sheet fixedly attached thereto, so as to define a plenum chamber associated with each perforated sheet, there being no air dispersion means within the confines of at least one of the plenum chambers;

means for coupling the upper surface of each of said plenum backing members having at least one perforated sheet fixedly attached thereto, to the load-support member; and means for supplying pressurized air to the plenum chambers through each air inlet aperture, comprising a plurality of substantially independent sources of pressurized air, each plenum chamber being in communication with one of said substantially independent sources of pressurized air such that the air pressure inside each plenum chamber can be maintained at a pressure greater than that outside each plenum chamber to create the friction-reducing cushion of air.

2. The apparatus as claimed in claim 1, wherein each of said substantially independent sources of pressurized air are external of the load-support member, and wherein the means for supplying pressurized air to the plenum chambers further comprises:

a plurality of nozzles, at least one of which is fixedly mounted onto each of said plenum backing members, the nozzles being fixedly mounted so that pressurized air can enter into the plenum chambers through the at least one air inlet aperture in each of said backing members; and means for connecting the nozzles to said substantially independent sources of pressurized air.

3. The apparatus as claimed in claim 2, wherein the means for connecting the nozzles is a plurality of conduits.

4. The apparatus as claimed in claim 2, wherein there is an active air dispersion means within the confines of at least one of the plenum chambers.

5. The apparatus as claimed in claim 1, wherein said substantially independent sources of pressurized air are substantially self-standing units.

6. The apparatus as claimed in claim 5, wherein the load to be moved upon a friction-reducing cushion of air is at least one passenger, the load-support member is a passenger carrier means so configured as to adequately carry at least one passenger over the surface over which the apparatus will move, and any one of the plenum chambers is free of separate means for dispersing the air within the plenum chamber.

7. The apparatus as claimed in claim 5, further comprising a plurality of receptacles each of which is adapted for receiving pressurized air from one substantially self-standing unit, each substantially self-standing unit being fixedly mounted so that pressurized air can be forced directly through the air inlet apertures in each plenum backing member and into the plenum chambers.

8. The apparatus as claimed in claim 7, wherein each substantially self-standing unit is a system comprising a fan means, a motor means to drive the fan means, and suitable electrochemical storage battery means to power the motor means.

9. The apparatus as claimed in claim 5, wherein the load to be moved upon a friction-reducing cushion of air comprises merchandise intended to be displayed and the load-support member is a display means for the merchandise so configured as to display the merchandise in a desired fashion.

10. The apparatus as claimed in claim 9, wherein each substantially self-standing unit is a system comprising a fan means and a motor means to drive the fan means, the apparatus to further comprise an external suitable electrochemical storage battery means to power the motor means.

11. The apparatus as claimed in claim 5, wherein at least one of the substantially self-standing units is fixedly mounted on the load-support member, and wherein the means for supplying pressurized air to the plenum chambers further comprises a plurality of conduits extending at least partially between the substantially self-standing units and said plenum backing members.

12. The apparatus as claimed in claim 11, wherein each substantially self-standing unit comprises a fan means, the apparatus to further comprise at least one motor means to drive the fan means.

13. In combination in an amusement ride system, said system comprising:

a substantially portable apparatus for movement of a load upon a friction-reducing cushion of air, as claimed in claim 12, wherein at least one of said plenum backing members has a configuration that is capable of generally contouring the surface over which the portable apparatus will move, so that said backing member remains generally parallel to the surface; and wherein the portable apparatus is propelled by gravity, any one of the plenum chambers is free of separate means for dispersing the air within the plenum chamber, the load to be moved is at least one passenger, and the load-support member is a passenger carrier means so configured as to adequately carry at least one passenger;

a battery means to power the motor means, the battery means to be fixedly mounted on the load-support member; and a track for guiding the portable apparatus over a predetermined desired path surface having a starting and finishing end, the starting end being generally higher in elevation than the finishing end so that the portable apparatus moves over the friction-reducing cushion of air in a direction from the starting end to the finishing end.

14. The system as claimed in claim 13, wherein the load-support member has a forward and a trailing end, and wherein each plenum backing member has a longitudinal axis, and at least two plenum backing members are attached to the load-support member so that the endpoints of each of the two longitudinal axes nearest to the forward end of the load-support member are closer together than the endpoints of the two longitudinal axes nearest to the trailing end of the load-support member.

15. In combination in an amusement ride system, said system comprising:

a substantially portable apparatus for movement of a load upon a friction-reducing cushion of air, as claimed in claim 11, wherein the load is at least one passenger;

means for guiding the portable apparatus, wherein the surface over which the portable apparatus will move is a generally predetermined desired path surface; and means for powering the motor means.

16. The system as claimed in claim 18, wherein the means for guiding the portable apparatus is a track having a starting and finishing end, the starting end being generally higher in elevation than the finishing end so that the portable apparatus moves over the friction-reducing cushion of air in a direction from the starting end to the finishing end.

17. The system as claimed in claim 15, wherein the means for powering the motor means is a suitable electrochemical storage battery fixedly mounted on the load-support member.

18. A substantially portable apparatus, propelled by means external to the portable apparatus, for movement of a load upon a friction-reducing cushion of air, comprising:

a load-support member;

a plurality of plenum backing members, each of which has at least one air inlet aperture and has upper and lower surfaces;

a plurality of thin flexible perforated sheets, each of said plenum backing members having at least one perforated sheet fixedly attached thereto, so as to define a plenum chamber associated with each perforated sheet;

at least one of said plenum backing members being partially flexible and having a configuration that is capable of generally contouring the surface over which the portable apparatus will move, so that said backing member remains generally parallel to the surface, any one of the plenum chambers being free of separate means for dispersing the air within the plenum chamber;

means for coupling the upper surface of each of said plenum backing members having at least one perforated sheet fixedly attached thereto, to the load-support member;

means for supplying pressurized air to the plenum chambers through each air inlet aperture, such that the air pressure inside each plenum chamber can be maintained at a pressure greater than that outside each plenum chamber to create the friction-reducing cushion of air; and the means for supplying pressurized air comprising a plurality of substantially independent sources of pressurized air external of the load-support member, a plurality of nozzles, at least one of which is fixedly mounted onto each of said plenum backing members, the nozzles being fixedly mounted so that pressurized air can enter into the plenum chambers through the at least one air inlet aperture in each of said backing members, and means for connecting the nozzles to said substantially independent sources of pressurized air.

19. The apparatus as claimed in claim 18, wherein the means for connecting the nozzles is a purality of conduits, the load to be moved upon a friction-reducing cushion of air is at least one passenger, and the load-support member is a passenger carrier means so configured as to adequately carry at least one passenger over the surface over which the apparatus will move.

20. A substantially portable apparatus, propelled by means external to the portable apparatus, for movement of merchandise intended to be displayed upon a friction-reducing cushion of air, comprising:

a load-support member;

a plurality of plenum backing members, each of which has at least one air inlet aperture and has upper and lower surfaces;

a plurality of thin flexible perforated sheets, each of said plenum backing members having at least one perforated sheet fixedly attached thereto, so as to define a plenum chamber associated with each perforated sheet;

at least one said plenum backing members being partially flexible and having a configuration that is capable of generally contouring the surface over which the portable apparatus will move, so that said backing member remains generally parallel to the surface; any one of the plenum chambers being free of separate means for dispersing the air within the plenum chamber;

means for coupling the upper surface of each of said plenum backing members having at least one perforated sheet fixedly attached thereto, to the load-support member; and means for supplying pressurized air to the plenum chambers through each air inlet aperture, comprising a plurality of substantially self-standing sources of pressurized air, such that the air pressure inside each plenum chamber can be maintained at a pressure greater than that outside each plenum chamber to create the friction-reducing cushion of air.

21. The apparatus as claimed in claim 20, wherein the load-support member is a display means for the merchandise so configured as to display the merchandise in a desired fashion.

22. In combination in an amusement ride system, said system comprising:

a substantially portable apparatus for movement of at least one passenger upon a friction-reducing cushion of air, comprising: a load-support member; a plurality of plenum backing members, each of which has at least one air inlet aperture and has upper and lower surfaces; a plurality of thin flexible perforated sheets, each of said plenum backing members having at least one perforated sheet fixedly attached thereto so as to define a plenum chamber associated with each perforated sheet; means for coupling the upper surface of each of said plenum backing members having at least one perforated sheet fixedly attached thereto, to the load-support member; means for supplying pressurized air to the plenum chambers through each air inlet aperture, comprising a plurality of substantially self-standing sources of pressurized air, at least one of which is fixedly mounted on the load-support member, a plurality of conduits extending at least partially between the substantially self-standing units and said plenum backing members, and a fan means; and at least one motor means to drive the fan means;

load-support member having a forward and a trailing end, each plenum backing member having a longitudinal axis, at least two plenum backing members being attached to the load-support member so that the endpoints of each of the longitudinal axes nearest to the forward end of the load-support member are closer together than the endpoints of the two longitudinal axes nearest to the trailing end of the load-support member;

means for guiding the portable apparatus, wherein the surface over which the portable apparatus will move is a generally predetermined desired path surface; and means for powering the motor means.

23. A substantially portable apparatus, propelled by means external to the portable apparatus, for movement of a load upon a friction-reducing cushion of air, comprising:

at least one plenum backing member, each of which has a plurality of air inlet apertures and has upper and lower surfaces;

at least one thin flexible perforated sheet fixedly attached to each plenum backing member, so as to define a plurality of plenum chambers associated with each plenum backing member;

means for supplying pressurized air to the plenum chambers through each air inlet aperture, comprising a plurality of substantially independent sources of pressurized air, each plenum chamber to be effectively independently pressurized by one of said substantially independent sources of pressurized air, so that sufficient air resides in each plenum chamber at a pressure greater than that outside each plenum chamber to force air through the perforations in each perforated sheet, thus creating an air cushion between each perforated sheet and the surface over which the portable apparatus will move.

24. The apparatus as claimed in claim 23, wherein each of said substantially independent sources of pressurized air are external of each plenum backing member, and wherein the means for supplying pressurized air to the plenum chambers further comprises:

a plurality of nozzles fixedly mounted onto each plenum backing member so that pressurized air can enter into the plenum chambers through at least one air inlet aperture associated with each plenum chamber; and a plurality of conduits connecting the nozzles to said substantially independent sources of pressurized air.

25. The apparatus as claimed in claim 24, wherein at least one of said plenum backing members is partially flexible and has a configuration that is capable of generally contouring the surface over which the portable apparatus will move, so that said backing member remains generally parallel to the surface, and wherein any one of the plenum chambers is free of separate means for dispersing the air within the plenum chamber.

26. The apparatus as claimed in claim 24 wherein there is an active air dispersion means within the confines of at least one of the plenum chambers.

27. The apparatus as claimed in claim 23, wherein said substantially independent sources of pressurized air are substantially self-standing units fixedly mounted on said plenum backing members, said backing members are adaptable to support the load, and the means for supplying pressurized air to the plenum chambers further comprises a plurality of conduits extending at least partially between the substantially self-standing units and said plenum backing members.

28. The apparatus as claimed in claim 27, wherein there is an active air dispersion means within the confines of at least one of the plenum chambers.

29. The apparatus as claimed in claim 23, wherein said substantially independent sources of pressurized air are substantially self-standing units comprising a fan means and a motor means to drive the fan means; the apparatus further comprising a plurality of receptacles each of which has inner wall surfaces and each of which is adapted for receiving pressurized air from one substantially self-standing unit, each self-standing unit to be fixedly mounted on at least one inner wall surface of one receptacle so that pressurized air is forced directly through the air inlet apertures in said plenum backing members and into the plenum chambers.

30. A substantially portable apparatus, propelled by means external to the portable apparatus and adapted to support a motor vehicle for movement upon a friction-reducing cushion of air, comprising:

a plurality of partially flexible plenum backing members, each of which has at least one air inlet aperture and has upper and lower surfaces;

a plurality of thin flexible perforated sheets, each of said plenum backing members having at least one perforated sheet fixedly attached thereto, so as to define a plurality of plenum chambers;

each of said plenum backing members having an indentation configured to allow the upper surface thereof to be coupled to the motor vehicle; and means for supplying pressurized air to the plenum chambers through each air inlet aperture, comprising a plurality of substantially self-standing sources of pressurized air, each plenum chamber to be effectively independently pressurized by one of said substantially self-standing sources, so that sufficient air resides in each plenum chamber at a pressure greater than that outside each plenum chamber to force air through the perforations in each perforated sheet, thus creating an air cushion between each perforated sheet and the surface over which the portable apparatus will move.

31. The apparatus as claimed in claim 30, wherein the substantially self-standing units are fixedly mounted on said plenum backing members, and wherein the means for supplying pressurized air to the plenum chambers further comprises a plurality of conduits extending at least partially between the substantially self-standing units and said plenum backing members.

* * * * *